(12) United States Patent
Li et al.

(10) Patent No.: US 11,948,595 B2
(45) Date of Patent: Apr. 2, 2024

(54) METHOD FOR DETECTING AUDIO, DEVICE, AND STORAGE MEDIUM

(71) Applicant: BIGO TECHNOLOGY PTE. LTD., Singapore (SG)

(72) Inventors: Zhen Li, Guangzhou (CN); Zhenchuan Huang, Guangzhou (CN); Yu Zou, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 273 days.

(21) Appl. No.: 17/282,732

(22) PCT Filed: Aug. 23, 2019

(86) PCT No.: PCT/CN2019/102172
§ 371 (c)(1),
(2) Date: Apr. 2, 2021

(87) PCT Pub. No.: WO2020/073743
PCT Pub. Date: Apr. 16, 2020

(65) Prior Publication Data
US 2022/0005493 A1    Jan. 6, 2022

(30) Foreign Application Priority Data
Oct. 10, 2018 (CN) .......................... 201811178750.2

(51) Int. Cl.
*G10L 25/30* (2013.01)
*G10L 15/16* (2006.01)
(Continued)

(52) U.S. Cl.
CPC .............. *G10L 25/30* (2013.01); *G10L 15/16* (2013.01); *G10L 17/06* (2013.01); *G10L 17/18* (2013.01);
(Continued)

(58) Field of Classification Search
CPC ......... G10L 17/00; G10L 17/06; G10L 17/18; G10L 17/26; G10L 25/03; G10L 25/30; G10L 25/27; G10L 25/78
See application file for complete search history.

(56) References Cited

U.S. PATENT DOCUMENTS 9,560,193 B1 * 1/2017 Hogg, Jr. .......... H04M 3/42348
10,008,209 B1    6/2018 Qian et al.
(Continued)

FOREIGN PATENT DOCUMENTS

CN    101226743 A    7/2008
CN    101770774 A    7/2010
(Continued)

OTHER PUBLICATIONS

International Search Report of the International Searching Authority for China National Intellectual Property Administration in PCT application No. PCT/CN2019/102172 dated Nov. 25, 2019, which is an international application corresponding to this U.S. application.

(Continued)

*Primary Examiner* — Samuel G Neway
(74) *Attorney, Agent, or Firm* — Kolitch Romano Dascenzo Gates LLC (57) ABSTRACT

Provided is a method for detecting audio, which includes acquiring audio file data; determining attribute detection data corresponding to the audio file data; and generating a voice detection result corresponding to the audio file data by voice violation detection on the attribute detection data by a fully connected network model. A device for detecting audio and a non-transitory computer-readable storage medium are also provided.

17 Claims, 3 Drawing Sheets

(51) Int. Cl.
*G10L 17/06* (2013.01)
*G10L 17/18* (2013.01)
*G10L 17/26* (2013.01)
*G10L 25/03* (2013.01)
*G10L 25/78* (2013.01)

(52) U.S. Cl.
CPC .............. *G10L 17/26* (2013.01); *G10L 25/03* (2013.01); *G10L 25/78* (2013.01)

(56) References Cited

U.S. PATENT DOCUMENTS

| | | | | |
|---|---|---|---|---|
| 2006/0248019 | A1* | 11/2006 | Rajakumar | G06Q 20/24 705/64 |
| 2007/0071206 | A1* | 3/2007 | Gainsboro | H04M 3/42221 379/168 |
| 2010/0088088 | A1* | 4/2010 | Bollano | G10L 15/065 704/243 |
| 2010/0303211 | A1* | 12/2010 | Hartig | G06Q 20/4016 379/1.01 |
| 2011/0082874 | A1* | 4/2011 | Gainsboro | G06F 16/2428 715/825 |
| 2015/0019222 | A1* | 1/2015 | Zhang | G10L 17/02 704/246 |
| 2016/0261743 | A1* | 9/2016 | Grodek | G10L 25/51 |
| 2017/0358306 | A1* | 12/2017 | Xue | G10L 17/18 |
| 2018/0351756 | A1* | 12/2018 | Dave | H04N 21/4788 |
| 2019/0052471 | A1* | 2/2019 | Panattoni | H04L 67/306 |
| 2019/0089656 | A1* | 3/2019 | Johnson, Jr. | G06F 40/284 |
| 2019/0270021 | A1* | 9/2019 | Hume | A63F 13/87 |
| 2022/0005493 | A1* | 1/2022 | Li | G10L 25/78 |

FOREIGN PATENT DOCUMENTS

| | | |
|---|---|---|
| CN | 201698746 U | 1/2011 |
| CN | 102436806 A | 5/2012 |
| CN | 102572839 A | 7/2012 |
| CN | 102820033 A | 12/2012 |
| CN | 103731832 A | 4/2014 |
| CN | 103796062 A | 5/2014 |
| CN | 103796183 A | 5/2014 |
| CN | 104616666 A | 5/2015 |
| CN | 105827787 A | 8/2016 |
| CN | 105869630 A | 8/2016 |
| CN | 106791024 A | 5/2017 |
| CN | 107527617 A | 12/2017 |
| CN | 107610707 A | 1/2018 |
| CN | 107919137 A | 4/2018 |
| CN | 108269574 A | 7/2018 |
| CN | 108419091 A | 8/2018 |
| CN | 108428447 A | 8/2018 |
| CN | 109065069 A | 12/2018 |
| IN | 108053840 A | 5/2018 |
| WO | 2008092473 A1 | 8/2008 |

OTHER PUBLICATIONS

The State Intellectual Property Office of People's Republic of China, First Office Action in Patent Application No. CN201811178750.2 dated May 25, 2020, which is a foreign counterpart application corresponding to this U.S. Patent Application, to which this application claims priority.
Wold, Erling; et al. "Content-Based Classification, Search, and Retrieval of Audio"; IEEE, Fall 1996.
Notification to Grant Patent Right for Invention of Chinese Application No. 201811178750.2 dated Jul. 28, 2020.
Search Report and Written Opinion for Intellectual Property Office of Singapore in Singapore application No. 11202103561T dated Jan. 17, 2023.

* cited by examiner

METHOD FOR DETECTING AUDIO, DEVICE, AND STORAGE MEDIUM

CROSS-REFERENCE TO RELATED APPLICATIONS

This application is a US national stage of international application No. PCT/CN2019/102172, filed on Aug. 23, 2019, which claims priority to Chinese Patent Application No. 201811178750.2, filed on Oct. 10, 2018 and entitled "AUDIO DETECTION METHOD AND DEVICE, EQUIPMENT AND STORAGE MEDIUM." Both applications are herein incorporated by reference in their entireties.

TECHNICAL FIELD

The present disclosure relates to the field of computer network technologies, and in particular, relates to a method and device for detecting audio, and a storage medium thereof.

BACKGROUND

With the rapid development of computer network technologies, by device-mounted software with a voice chat function, the user is allowed to make a voice chat with other users via the network, or participate in multi-person voice chat and entertainment by joining a specific chat room or chat group. In an actual chat environment, the voice information may contain uncomfortable violation voice data, such as harsh and high-decibel voices, and inappropriate content.

In order to crack down on violation voice data, two schemes are often employed in the related art. In one scheme, the software is equipped with a reporting portal for normal users to report users who violate the regulations, and a software platform makes corresponding handlings and penalties according to clues in the report. In the other scheme, manpower is deployed on the platform side to handle violation voices by manual sampling or monitoring.

SUMMARY Embodiments of the present disclosure provide a method and device for detecting audio, and a storage medium thereof.

In a first aspect, the embodiments of the present disclosure provide a method for detecting audio. The method includes: acquiring audio file data; determining attribute detection data corresponding to the audio file data, wherein the attribute detection data includes at least two of: user rating data, classification probability data, and voiceprint feature data, the user rating data being indicative of a user rating, the classification probability data being indicative of a classification probability corresponding to a voice violation, and the voiceprint feature data being indicative of a voiceprint feature corresponding to the audio file data; and generate a voice detection result corresponding to the audio file data by voice violation detection on the attribute detection data by a pre-trained fully connected network model.

In a second aspect, the embodiments of the present disclosure further provide a device for use in detecting audio. The device includes a processor and a memory configured to store at least one instruction therein, wherein the processor, when loading and executing the at least one instruction, is caused to perform the method for detecting audio according to the first aspect.

In a third aspect, the embodiments of the present disclosure further provide a computer-readable storage medium storing at least one instruction therein, wherein the at least one instruction, when loaded and executed by a processor of a device, causes the device to perform the method for detecting audio according to the first aspect.

DETAILED DESCRIPTION

It is difficult to effectively prevent large amounts of violation voice data that randomly appear at the same time by using normal users reporting, manual sampling or monitoring, which are employed in the related art. The normal users reporting, and manual sampling/monitoring tend to intervene upon occurrence of an event or after the development of the event to some extent, and thus resulting in time lag and high cost.

Figure 1:
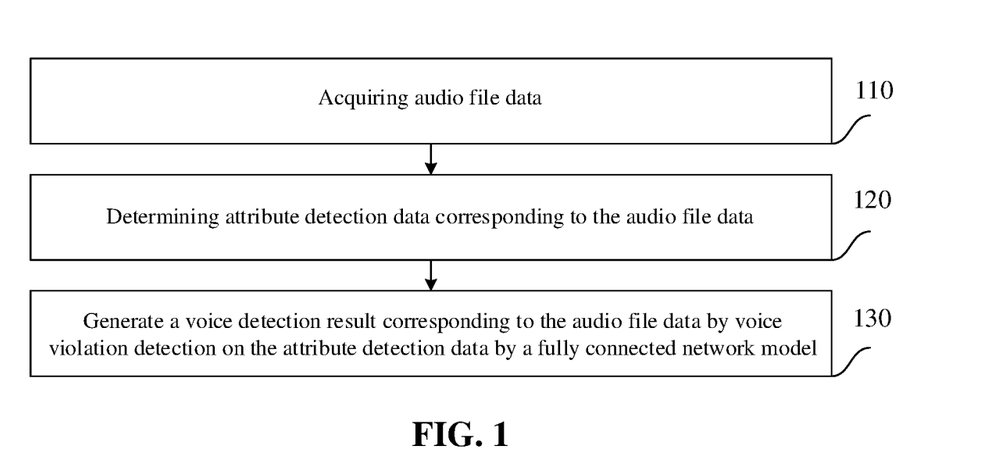
FIG. 1 is a schematic flowchart of processes of a method for detecting audio according to an embodiment of the present disclosure.

Referring to FIG. 1, a schematic flowchart of processes of a method for detecting audio according to an embodiment of the present disclosure is shown. The method may include process 110 to process 130.

In 110, audio file data is acquired.

In an exemplary embodiment of the present disclosure, in the process of detecting voice violations, audio file data to be detected currently may be acquired, such that whether the currently acquired audio file data contains violation voice data corresponding to the voice violations is detected. The audio file data may be indicative of the data contained in an audio file, e.g., voice data in a sound file. It should be noted that the sound file may be generated by the device according to a user's speech, may carry and be indicative of voice data to be sent by the user, and may include violation voice data corresponding to voice violations, voice data that meets predetermined voice regulations (i.e., compliant voice data) and the like, which is not limited in the embodiments of the present disclosure.

In an embodiment, the user's speech forms voice data. The voice data may be input into software through a software interface, such that the software may determine the voice data as audio file data. That is, the software may acquire audio file data, such that the software may automatically perform audio detection on the audio file data. Alternatively, the software may transmit the acquired audio file data to a software platform via a network, such that the software platform may acquire the audio file data, and then may perform audio detection on the audio file data.

In 120, attribute detection data corresponding to the audio file data is determined.

In an embodiment of the present disclosure, in response to acquiring the audio file data, the attribute detection data corresponding to the audio file data is determined by processing the acquired audio file data, such that voice violation detection may be performed subsequently on the attribute detection data. The attribute detection data may include at least two of: user rating data, classification probability data, voiceprint feature data, and the like, which is not limited in the embodiments of the present disclosure.

It should be noted that all of the user rating data, the classification probability data, the voiceprint feature data, and the like may be acquired in advance and stored in a predetermined location, such that the data is read from the predetermined location for comparison or determination when step 120 is performed. The user rating data may determine a user rating of a target user, and the user rating may be determined in advance based on consumption habits and history login behaviors of the target user. For example, the user rating of the target user may be determined by normalizing history recharge records and history login behavior data of the target user. The history login behavior data may be indicative of user's history login behaviors. For example, history login duration data, as the history login behavior data, may be indicative of a user's history login duration. The target user may be interpreted as a user who sends audio file data, such as a user who sends voice information during a voice communication process. The higher the user rating of the target user is, the less likely the target user sends violation voice data.

The classification probability data may be indicative of a classification probability corresponding to voice violations, such as a voice violation probability, or a voice compliance probability. The voice violation probability may be interpreted as a probability that voice data contained in the audio file data is violation voice data. The voice compliance probability may be interpreted as a probability that the voice data contained in the audio file data is compliant voice data. In an embodiment, the magnitude of the voice violation probability may be interpreted as the following factors: harshness, high decibels, audio content information and the like. For example, in a case where the audio file data contains malicious voice data such as harsh voice, high decibel voice, and inappropriate content, the voice violation probability corresponding to the audio file data will increase. That is, if the audio contains uncomfortable information such as harsh voice, high decibel voice, and inappropriate content, maliciously sent by users, the violation probability of the audio increases.

The voiceprint feature data may be indicative of a voiceprint feature corresponding to the audio file data. The voiceprint feature may be interpreted as a user's sound texture feature. The sound texture feature may be interpreted as a frequency-domain feature of a sound in the time domain, generated by Fourier transform and other post-processing of an original audio waveform of a user.

In an embodiment, in response to acquiring the audio file data, the user rating data, the classification probability data, or the voiceprint feature data corresponding to the user will be searched or acquired based on user information corresponding to the audio file data, wherein at least one of these data is taken as the attribute detection data of the audio file data. Therefore, in an embodiment of the present disclosure, the attribute detection data determined in 120 may include at least two of: the user rating data, the classification probability data and the voiceprint feature data. The user rating data is indicative of a user rating, and the classification probability data is indicative of a classification probability corresponding to voice violations, and the voiceprint feature data is indicative of a voiceprint feature corresponding to the audio file data. Exemplarily, the attribute detection data includes the user rating data, the classification probability data, and the voiceprint feature data at the same time, such that the voice detection results are more accurate.

In 130, a voice detection result corresponding to the audio file data is generated by voice violation detection on the attribute detection data by a fully connected network model.

According to the embodiment of the present disclosure, in response to determining the attribute detection data corresponding to the audio file data, the attribute detection data may be taken as an input of the pre-trained fully connected network model. Subsequently, a voice detection result corresponding to the audio file data may be generated by inputting the attribute detection data into the pre-trained fully connected network and subjecting the attribute detection data to voice violation detection by the fully connected network model. It may be determined that the audio file data contains violation voice data in a case where the voice detection result is a voice violation detection result. That is, the violation voice data corresponding to the voice violation is detected. It may be determined that the audio file data does not contain violation voice data in a case where the voice detection result is not a voice violation detection result. It may be determined that the audio file data does not contain the violation voice data corresponding to the voice violation in a case where the voice detection result is a normal voice detection result.

In summary, according to the embodiment of the present disclosure, in response to acquiring the audio file data, the voice violation detection may be performed by determining the attribute detection data corresponding to the audio file data, such that the violation voice data corresponding to the voice violation may be detected in time to ensure the normal use of the user, thereby avoiding the related time lag in the detection of voice violations caused by user reports and manual spot checks, ensuring the normal user experience, meeting the user needs, and having a low cost.

Accordingly, when it is detected that a voice to be sent by the user violates the regulations, the transmission of voice data of this user to other users is restricted or suspended. In an embodiment, when it is determined that the user violates the regulations based on the audio file data of the user, corresponding information is sent to a user's client, such that the client suspends the user's voice chat function.

In an embodiment of the present disclosure, in response to acquiring the audio file data, the audio file data may be sliced, such that at least two frames of audio time-domain information upon the slicing may be acquired. Subsequently, audio feature data may be acquired by feature extraction on the acquired at least two frames of audio time-domain information, such that the attribute detection data corresponding to the audio file data is determined from the audio feature data. The audio feature data may be indicative of audio features, such as magnitude features, and voiceprint features of an audio.

For example, in the case where the audio feature data is magnitude spectrum (Mags) feature data, classification probability data corresponding to the audio file data may be generated based on the Mags feature data, such that voice violation detection may be performed subsequently on the classification probability data. The Mags feature data may be indicative of a Mags feature of the audio. It should be noted that in the process of practicing the embodiments of the present disclosure, the applicant has found through in-depth analysis and experiments that the Mags feature has a good effect in the detection of sound violations. Therefore, as described hereinafter, some schemes of the embodiments of the present disclosure are expanded accordingly in combination with the Mags feature.

In an embodiment of the present disclosure, determining the attribute detection data corresponding to the audio file data may include: acquiring at least two frames of audio time-domain information by slicing the audio file data; acquiring Mags feature data and voiceprint feature data by feature extraction on the at least two frames of audio time-domain information; generating feature vector data by splicing the Mags feature data and the voiceprint feature data; and acquiring classification probability data as the attribute detection data by voice classification on the feature vector data by a voice classification model. The feature extraction may include: Mags feature extraction, voiceprint feature extraction, and the like, which is not limited in the embodiments of the present disclosure.

For example, during the voice communication process, the audio file data to be sent may be acquired; and a plurality of frames of audio time-domain information may be acquired by slicing the acquired audio file data by using a predetermined moving window. Therefore, Mags feature data may be acquired by Mags feature extraction on at least two frames of audio time-domain information. In addition, voiceprint feature data corresponding to the audio file data may be acquired by voiceprint feature extraction on at least two frames of audio time-domain information. Subsequently, one-dimensional feature vector data may be acquired by splicing the acquired Mags feature data with the voiceprint feature data; and the feature vector data may be determined as an input of the voice classification model, and classification probability data corresponding to the audio file data may be acquired by voice classification on the feature vector data by the voice classification model. In an embodiment, the voice classification model may extract audio features based on different audio inputs, that is, acquire input features by feature extraction based on the input feature vector data. Subsequently, a probability value of the audio input may be assigned based on the distribution of the input features, that is, a piece of classification probability data is assigned to the input feature vector data, and output as the attribute detection data for voice violation detection. In the case that the input features are similar to features of a predetermined violation sample, the voice classification model will assign a high violation probability to the input feature vector data, for example, output 90% as the voice violation probability of the feature vector data. In the case that the input features are similar to features of a predetermined normal sample, the voice classification model will assign a low violation probability to the input feature vector data, for example, output 1% as the voice violation probability of the feature vector data. That is, the voice compliance probability of the feature vector data is 99%.

In an embodiment, acquiring the Mags feature data by the feature extraction on the at least two frames of audio time-domain information may include: acquiring audio frequency-domain information by frequency-domain transformation on the at least two frames of audio time-domain information; and acquiring the Mags feature data by Mags feature extraction based on the audio frequency-domain information. The frequency-domain transformation may include Fourier transformation, such as fast Fourier transformation (FFT), which is not limited in the embodiments of the present disclosure.

As an example of the present disclosure, in response to slicing the audio file data into at least two small segments by using a predetermined moving window, each small segment may be referred to as one frame of audio time-domain information. Subsequently, audio frequency-domain information corresponding to each frame of audio time-domain information may be acquired by Fourier transformation on each frame of acquired audio-time-domain information. The Mags feature data corresponding to the audio file data may be acquired by the Mags feature extraction based on the audio frequency-domain information. For example, an average value and variance may be extracted from the Mags of the audio frequency-domain information, and then feature vector data based on the Mags feature data is generated by determining the extracted average value and variance as the Mags feature data. In this way, classification probability data corresponding to the audio file data may be acquired by voice classification on the feature vector data. There may be overlapping parts between two adjacent frames of audio time-domain information, that is, two frames have overlaps. For example, if a frame length of one frame of audio time-domain information is 25 milliseconds (ms), when the frame shift is 10 ms, an overlap of 15 ms may be present between the two frames. It should be noted that the frame length and the frame shift may be defined according to accuracy requirements, which is not limited in this example.

The acquired audio feature data may also be used as the attribute detection data to perform voice violation detection on the audio feature data. For example, when the audio feature data is voiceprint feature data, the voiceprint feature data may be used as the attribute detection data to perform voice violation detection on the audio feature data, which is not limited in the embodiments of the present disclosure.

In an embodiment of the present disclosure, determining the attribute detection data corresponding to the audio file data may include: acquiring at least two frames of audio time-domain information by slicing the audio file data; acquiring audio frequency-domain information by frequency-domain transformation on the at least two frames of audio time-domain information; acquiring first fixed-length data by averaging the audio frequency-domain information; and acquiring voiceprint feature data as the attribute detection data by voiceprint feature extraction by a neural network model based on the first fixed-length data. For example, in response to acquiring the audio file data to be detected, at least two frames of audio time-domain information are acquired by slicing the audio file data by using a moving window. Subsequently, audio frequency-domain information is acquired by FFT transformation on the acquired at least two frames of audio time-domain information. The audio frequency-domain information is averaged. For example, fixed-length data is acquired by averaging the audio frequency-domain information. The acquired fixed-length data may be determined as the first fixed-length data, and voiceprint feature data is acquired by inputting the first fixed-length data into a pre-trained neural network model for voiceprint feature extraction. The voiceprint feature data may then be taken as the attribute detection data corresponding to the audio file data and input into the fully connected network model to perform voice violation detection on the voiceprint feature data, thereby generating a voice detection result corresponding to the audio file data. The audio file data to be detected may include audio file data to be transmitted, audio file data to be played, and the like. The audio file data to be transmitted may be indicative of audio file data to be sent in the voice communication process; and the audio file data to be played may be indicative of file data of a voice to be played.

In an embodiment of the present disclosure, users may be classified based on their consumption habits, and voice violation detection may be performed based on the user rating acquired after the classification, so as to predict voice violations. In an embodiment, the method for detecting audio according to the embodiment of the present disclosure may further include acquiring history behavior data of a target user; and acquiring user rating data as the attribute detection data based on the history behavior data. The history behavior data includes at least one of: history login data, user consumption behavior data, violation history data, recharge history data, and the like.

Exemplarily, when a user rating of a certain user needs to be determined, the user may be determined as the target user; and history behavior data of the target user may be acquired from a database based on user identifiers of the target user, such as a user account, or a user name, such that the user rating of the target user is determined based on the acquired history behavior data, that is, user rating data of the target user is determined. Subsequently, the user rating data may be stored in the database. The user rating data may be acquired from the database during the audio detection as the attribute detection data.

According to the embodiment of the present disclosure, for the acquired audio file data, the history behavior data of the target user corresponding to the audio file data may also be acquired during the audio detection, so as to determine the user rating data as the attribute detection data in real time based on the acquired history behavior data. Therefore, the user rating data determined in real time may be used for voice violation detection, such that the accuracy of voice violation detection can be improved. For example, determining the attribute detection data corresponding to the audio file data includes: for the audio file data, acquiring history behavior data of the target user; and acquire user rating data as the attribute detection data by normalizing the history behavior data.

As an example of the present disclosure, in response to acquiring the audio file data, a user who sends the audio file data may be determined as the target user. Then, for the audio file data, history behavior data of the target user may be acquired based on a user identifier of the target user, the history behavior data including at least one of: user consumption behavior data, history login data, violation history data, recharge history data, and the like. The user consumption behavior data may determine consumption behavior habit information of the target user. The violation history data may determine voice violation history information of the target user, e.g., determine whether the target user has a violation history, or determine the number of violation histories of the target user, and the like. The recharge history data may determine recharge history information of the target user, such as the number of recharges of the target user, the history recharge amount, and the like. The user's history login data may determine history login behaviors of the target user, including: the number of logins, a login duration, a login address, and the like. The number of logins may be indicative of the number of logins of the target user. The login duration may be indicative of a history login duration of the target user, which may, for example, include a login duration corresponding to each login of the target user. The login address may determine an address in each login of the user, such as an Internet Protocol (IP) address, or a media access control (MAC) address of a device used by the target user to log in, which is not limited in this example.

The history behavior data of the target user may be normalized. For example, information such as the number of logins, the login duration, the existence or absence of a violation history, and a recharge history of the target user is digitalized and normalized. Therefore, the user rating data of the target user may be determined based on the normalization result. The user rating data may then be used as the attribute detection data and input into the pre-trained fully connected network model for voice violation detection, so as to generate a voice detection result.

In an embodiment of the present disclosure, generate the voice detection result corresponding to the audio file data by the voice violation detection on the attribute detection data by the fully connected network model includes: inputting the attribute detection data to the fully connected network model for detection; and determining the detection result output by the fully connected network model as the voice detection result.

Figure 2:
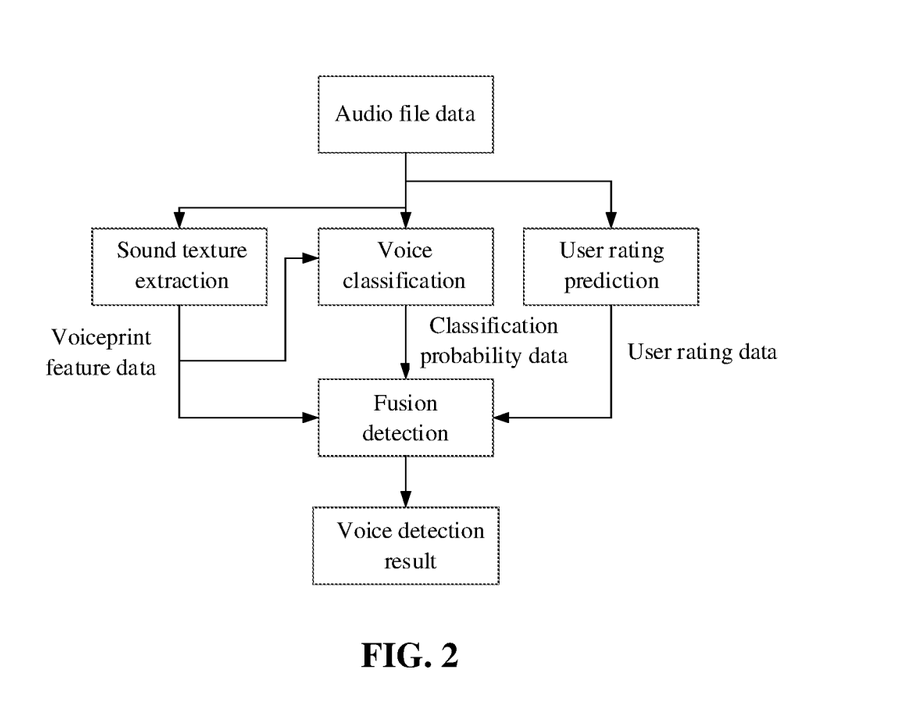
FIG. 2 is a schematic flowchart of a detection process of audio file data according to an embodiment of the present disclosure.

As an embodiment of the present disclosure, in response to acquiring the audio file data, as shown in FIG. 2, voiceprint feature data corresponding to the audio file data may be acquired by sound texture extraction based on, for example, a convolutional neural network (CNN). Sound classification may be performed based on Mags features. That is, a feature vector data may be generated by using Mags feature data corresponding to the audio file data, and classification probability data corresponding to the audio file data may be acquired by inputting the feature vector data into a voice classification model for voice classification. User rating prediction may be performed on the currently acquired audio file data based on the consumption behavior habit information corresponding to a user consumption habit, so as to determine the user rating data. Subsequently, fusion detection may be performed based on the user rating data, the classification probability data, and the voiceprint feature data. That is, three types of attribute detection data, i.e., the user rating data, the classification probability data, and the voiceprint feature data are input into the pre-trained fully connected network model, and fused by the fully connected network model to perform voice violation detection, thereby acquiring a detection result output by the pre-trained fully connected network model. Then, the detection result output by the fully connected network model may be used as a voice detection result, based on which whether the audio file data contains violation voice data may be determined, thereby realizing the prediction of voice violations, and avoiding detection time lag of voice violations in related art.

In an embodiment of the present disclosure, the method for detecting audio may further include: determining that the audio file data contains violation voice data in a case where the voice detection result is a voice violation detection result; and prohibiting the transmission or playback of the violation voice data.

Exemplarily, during the voice communication process, the audio file data to be sent currently by the target user may be acquired for voice violation detection, so as to determine whether the audio file data sent by the target user contains the violation voice data corresponding to the voice violations. Voice detection results are divided into a voice violation detection result and a normal voice detection result. In the case that the voice detection result output by the fully connected network model is the normal voice detection result, it may be determined that the currently acquired audio file data does not contain the violation voice data; and the audio file data may then be sent based on the normal voice detection result, such that other users who are in voice communication with the target user can receive and play the audio file data, thereby achieving the purpose of voice communication. In the case that the voice detection result output by the fully connected network model is the voice violation detection result, it may be determined that the currently acquired audio file data contains the violation voice data; and the transmission of the audio file data may then be prohibited based on the voice violation detection result. For example, a sending request corresponding to the audio file data is rejected to prohibit the transmission of the violation voice data contained in the audio file data, thereby avoiding a negative impact caused by the violation voice data, and ensuring the normal use of the users.

The audio file data acquired according to the embodiment of the present disclosure may also be other audio file data, such as audio file data to be played. In the case where it is detected that the voice detection result corresponding to the audio file data to be played is the voice violation detection result, the playback of the audio file data may be prohibited based on the voice violation detection result. Exemplarily, in the case where software detects that the voice detection result corresponding to the audio file data to be played is the voice violation detection result, the audio file data may be discarded or ignored. That is, the audio file data is not played, so as to prohibit the violation voice data contained in the audio file data from being played. After it is detected that the voice detection result corresponding to the audio file data to be played is the normal voice detection result, the audio file data may be played based on the normal voice detection result.

In addition, in response to determining the audio file data contains the violation voice data according to the embodiment of the present disclosure, a user's voice input corresponding to the violation voice data may be shielded. In an embodiment, the user may perform voice input through a voice input interface of software in the course of using the software, such that at least one of the software and a software platform corresponding to the software can acquire voice data input thereby. Therefore, the audio file data may be formed based on the acquired voice data. Audio detection may then be performed based on the audio file data to determine whether the voice data is violation voice data. In the case where the software or software platform detects that the voice detection result corresponding to the audio file data is the voice violation detection result, it may be determined that the audio file data contains the violation voice data. That is, it is determined that the voice data input by the user is the violation voice data. Then, the voice input interface of the software may be closed for this user, such that this user cannot perform voice input through the voice input interface of the software, so as to shield the voice input of this user. At least one of the software and the software platform may also use other methods to shield the user's voice input. For example, the voice input may be shielded by turning off a voice input function of the software, which is not limited in the embodiments of the present disclosure.

In an embodiment of the present disclosure, in response to determining the attribute detection data corresponding to the audio file data, the attribute detection data may be stored in a training set as attribute detection data to be trained, such that the attribute detection data to be trained may be acquired from the training set for training the fully connected network model. Exemplarily, the method for detecting audio according to the embodiment of the present disclosure may further includes: acquiring the attribute detection data to be trained; and acquire the fully connected network model by training the attribute detection data to be trained. The attribute detection data to be trained includes various attribute detection data acquired from the training set, such as user rating data, classification probability data, and voiceprint feature data.

For example, in response to determining the user rating data, the classification probability data, and the voiceprint feature data corresponding to the audio file data, the user rating data, the classification probability data, and the voiceprint feature data may be used as training data for the fully connected network model. That is, the user rating data, the classification probability data, and the voiceprint feature data are used as the attribute detection data to be trained. Then, the fully connected network model may be acquired by model training based on the fully-connected network structure, by using the classification probability data, the user rating data, and the voiceprint feature data. The fully connected network model may perform voice violation detection on the input attribute detection data, and output a voice detection result. The voice detection result may determine whether there is a voice violation, so as to determine whether the audio file data contains violation voice data corresponding to the voice violation.

According to the embodiment of the present disclosure, a corresponding network model may be acquired by training based on the audio file data by taking the audio file data as the training data. The network model may determine the attribute detection data corresponding to the audio file data and include: a neural network model, a voice classification model, and the like, which is not limited in the embodiments of the present disclosure. The neural network model may determine the voiceprint feature data corresponding to the audio file data; and the voice classification model may determine the classification probability data corresponding to the audio file data.

In an embodiment of the present disclosure, the method for detecting audio may further include: acquiring audio file data to be trained from a training set; acquiring frame time-domain information by slicing the audio file data to be trained by using a moving window; acquiring frame frequency-domain information by frequency-domain transformation on the frame time-domain information; acquire second fixed-length data by averaging the frame frequency-domain information; and acquire the neural network model by training according to a neural network algorithm based on the second fixed-length data and label data corresponding to the audio file data. The frequency-domain transformation may include Fourier transformation, FFT and the like.

In an embodiment of the present disclosure, the audio file data that needs to be trained may be stored in the training set in advance, and audio file data stored in the training set may be used as the audio file data to be trained. During the model training process, the audio file data to be trained may be acquired from the training set. At least two frames of time-domain information may be acquired by slicing the audio file data to be trained by using a predetermined moving window, that is, frame time-domain information is acquired. Subsequently, frame frequency-domain information may be acquired by frequency-domain transformation on the frame time-domain information, for example, FFT transform on the at least two frames of time-domain information. The frame frequency-domain information may be averaged. For example, fixed-length data may be acquired by averaging the frame frequency-domain information, which may be determined as the second fixed-length data.

In addition, corresponding label data may be set for the audio data to be trained. Thus, the label data and the second fixed-length data are used for training according to a neural network algorithm, e.g., network training according to a CNN algorithm, until the network converges. In the case of network convergence, a corresponding neural network model may be constructed based on network parameters acquired by training, such that voiceprint feature extraction may be performed subsequently by the neural network model. The neural network model may include: network parameters and at least two network layers, such as a convolutional layer, a fully connected layer, and the like, which is not limited in the embodiments of the present disclosure.

For example, in the training process of the neural network model, the acquired second fixed-length data and the label data corresponding to the audio file data may be input into the CNN model to train the network parameters of the CNN model until the network converges. The label data may label whether the audio data to be trained contains violation voice data corresponding to a voice violation.

In an embodiment of the present disclosure, during the training process, a voice classification model is trained based on the extracted voiceprint feature data. Exemplarily, the method for detecting audio may further include: acquiring frame time-domain information by slicing the acquired audio file data to be trained by using a moving window; acquiring Mags feature training data and voiceprint feature training data by feature extraction on the frame time-domain information, wherein the feature extraction includes: Mags feature extraction and voiceprint feature extraction; acquiring third fixed-length data by averaging the Mags feature training data; generating feature vector training data by splicing the Mags feature training data and the voiceprint feature training data; and acquiring the voice classification model by training the third fixed-length data and the feature vector training data.

In an embodiment of the present disclosure, in response to acquiring the audio file data to be trained, frame time-domain information may be acquired by slicing the audio file data to be trained by using a predetermined moving window. Then, Mags feature training data and voiceprint feature training data may be acquired by Mags feature extraction and voiceprint feature extraction on the frame time-domain information. For example, the frame frequency-domain information may be acquired by performing FFT on the frame time-domain information. Then, the Mags training data corresponding to the audio file data to be trained may be acquired by the Mags feature extraction on the frame frequency-domain information. In addition, the voiceprint feature training data corresponding to the audio file data to be trained may be acquired by the voiceprint feature extraction based on the frame frequency-domain information.

Subsequently, the Mags feature training data and the voiceprint feature training data are spliced to form feature vector training data, wherein the feature vector training data may be used as training data for the voice classification model, such that the voice classification model may be trained by using the feature vector training data. For example, when the voiceprint feature training data is a one-dimensional vector (1, 1024) and the Mags feature training data is a one-dimensional vector (1, 512), the two vectors may be spliced together to form a one-dimensional feature vector (1, 1536); and the one-dimensional feature vector (1, 1536) may be input as the feature vector training data to the predetermined fully connected network for training. Therefore, a two-layer fully connected network model may be acquired by training, and then the trained two-layer fully connected network model may be used as a voice classification model, such that the voice classification model may be used for voice classification subsequently.

In summary, according to the embodiment of the present disclosure, the voiceprint feature data corresponding to the audio file data may be acquired by the voiceprint feature extraction by the neural network model. The classification probability data corresponding to the audio file data is acquired by voice classification by the voice classification model. The user rating data is determined by normalizing the history behavior data of the target user. Therefore, the voice violation detection may be performed based on the voiceprint feature data, the classification probability data, and the user rating data. That is, the fusion of multiple attribute detection data corresponding to the audio file data for voice violation detection can effectively avoid the time lag, high cost and other situations in the manual detection of voice violations s in related art, reduce the investment cost for voice violation detection, and improve the accuracy of voice violation detection.

It should be noted that in order to simply describe the method embodiments, the embodiments are described as a series of combined actions. However, it should be understood by those skilled in the art that the embodiments of the present disclosure are not limited by described sequences of the actions. Therefore, some processes may be performed in other sequences or simultaneously based on the embodiments of the present disclosure.

Figure 3:
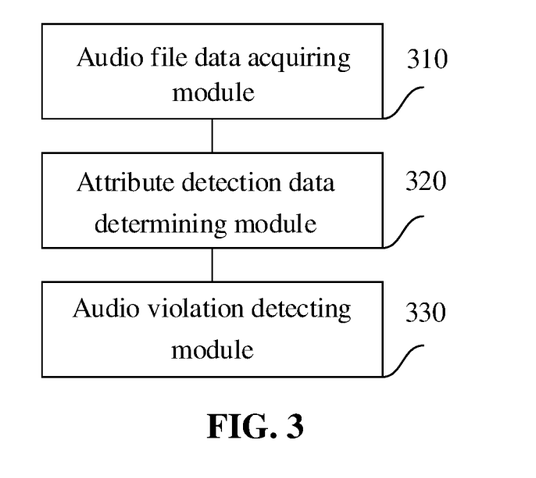
FIG. 3 is a schematic structural block diagram of an apparatus for detecting audio embodiment according to an embodiment of the present disclosure.

Referring to FIG. 3, a schematic structural block diagram of an apparatus for detecting audio embodiment according to an embodiment of the present disclosure is shown. The apparatus for detecting audio includes an audio file data acquiring module 310, an attribute detection data determining module 320, and a voice violation detecting module 330.

The audio file data acquiring module 310 is configured to acquire audio file data.

The attribute detection data determining module 320 is configured to determine attribute detection data corresponding to the audio file data. The attribute detection data includes at least two of: user rating data, classification probability data, and voiceprint feature data, the user rating data being indicative of a user rating, the classification probability data being indicative of a classification probability corresponding to a voice violation, and the voiceprint feature data being indicative of a voiceprint feature corresponding to the audio file data.

The voice violation detecting module 330 is configured to generate a voice detection result corresponding to the audio file data by voice violation detection on the attribute detection data by a fully connected network model.

In an embodiment of the present disclosure, the attribute detection data includes the classification probability data, and the attribute detection data determining module 320 may include a slicing sub-module, a feature extracting sub-module, a data splicing sub-module, and a classifying sub-module.

The slicing sub-module is configured to acquire at least two frames of audio time-domain information by slicing the audio file data.

The feature extracting sub-module is configured to acquire Mags feature data and voiceprint feature data by feature extraction on the at least two frames of audio time-domain information.

The data splicing sub-module is configured to generate feature vector data by splicing the Mags feature data and the voiceprint feature data.

The classifying sub-module is configured to acquire the classification probability data by voice classification on the feature vector data by a voice classification model.

In an embodiment, the feature extracting sub-module includes a frequency-domain transforming unit, a Mags feature extracting unit and a voiceprint feature extracting unit.

The frequency-domain transforming unit is configured to acquire audio frequency-domain information by frequency-domain transformation on the at least two frames of audio time-domain information.

The Mags feature extracting unit is configured to acquire Mags feature data corresponding to the audio file data by Mags feature extraction based on the audio frequency-domain information.

The voiceprint feature extracting unit is configured to acquire the voiceprint feature data by voiceprint feature extraction based on the audio frequency-domain information.

In an embodiment, the classifying sub-module includes an averaging unit and a classifying unit.

The averaging unit is configured to acquire fixed-length data by averaging the Mags feature training data.

The classifying module is configured to acquire classification probability data corresponding to the audio file data by voice classification on the feature vector data based on the fixed-length data by a voice classification model.

In an embodiment of the present disclosure, the attribute detection data includes the voiceprint feature data and the attribute detection data determining module 320 may include a slicing sub-module, a frequency-domain transforming sub-module, a frequency-domain averaging sub-module, and a voiceprint feature extracting sub-module.

The slicing sub-module is configured acquire at least two frames of audio time-domain information by slicing the audio file data.

The frequency-domain transforming sub-module is configured to acquire audio frequency-domain information by frequency-domain transformation on the at least two frames of audio time-domain information.

The frequency-domain averaging sub-module is configured acquire first fixed-length data by averaging the audio frequency-domain information to.

The voiceprint feature extracting sub-module is configured to acquire voiceprint feature data by voiceprint feature extraction by a neural network model based on the first fixed-length data.

In an embodiment of the present disclosure, the attribute detection data includes the user rating data and the apparatus for detecting audio may also include a history behavior data acquiring module and a user rating data determining module.

The history behavior data acquiring module is configured to acquire history behavior data of the target user.

The user rating data determining module is configured to acquire user rating data based on the history behavior data, and store the user rating data in the database. The history behavior data includes at least one of: history login data, user consumption behavior data, violation history data, and recharge history data.

The attribute detection data determining module 320 is configured to acquire the user rating data corresponding to the target user from the database based on user information corresponding to the audio file data.

In an embodiment of the present disclosure, the attribute detection data determining module 320 may include a behavior data acquiring sub-module and a normalizing sub-module.

The history behavior data acquiring module is configured to acquire history behavior data of a target user with respect to the audio file data.

The normalizing sub-module is configured to determine user rating data of the target user by normalizing the history behavior data.

According to the embodiments of the present disclosure, the history login data includes: the number of logins, a login duration, a login address, and the like. Exemplarily, the attribute detection data may include at least two of: user rating data, classification probability data, and voiceprint feature data, wherein the user rating data is indicative of a user rating, and the classification probability data is indicative of a classification probability corresponding to a voice violation, and the voiceprint feature data is indicative of a voiceprint feature corresponding to the audio file data.

In an embodiment of the present disclosure, the voice violation detecting module 330 includes an input sub-module and an output sub-module.

The input sub-module is configured to input the attribute detection data to the fully connected network model for detection.

The output sub-module is configured to determine a detection result output by the fully connected network model as the voice detection result.

In an embodiment, the apparatus may also include a violation voice data determining module, a transmission prohibiting module, a playing prohibiting module, and a voice input shielding module.

The violation voice data determining module is configured to determine that the audio file data includes violation voice data in response to the voice detection result being a voice violation detection result.

The transmission prohibiting module is configured to prohibit the transmission of the violation voice data.

The playing prohibiting module is configured to prohibit the playback of the violation voice data.

The voice input shielding module is configured to shield a voice input from a user corresponding to the violation voice data.

In the above embodiments, the apparatus for detecting audio may further include a training data acquiring module, a slicing module, a frequency-domain transforming module, an averaging module, and a neural network training module.

The training data acquiring module is configured to acquire audio file data to be trained from a training set.

The slicing module is configured to acquire frame time-domain information by slicing the audio file data to be trained by using a moving window.

The frequency-domain transforming module is configured to acquire frame frequency-domain information by frequency-domain transformation on the frame time-domain information.

The averaging module is configured to acquire second fixed-length data by averaging the frame frequency-domain information.

The neural network training module is configured to acquire the neural network model by training according to a neural network algorithm based on the second fixed-length data and label data corresponding to the audio file data.

In an embodiment of the present disclosure, the apparatus for detecting audio may also include a slicing module, a feature extracting module, an averaging module, a training data splicing module, and a voice classification model training module.

The slicing module is configured to acquire frame time-domain information by slicing the acquired audio file data to be trained by using a moving window.

The feature extracting module is configured to acquire Mags feature training data and voiceprint feature training data by feature extraction on the frame time-domain information, wherein the feature extraction includes: Mags feature extraction and voiceprint feature extraction.

The averaging module is configured to acquire third fixed-length data by averaging the Mags feature training data.

The training data splicing module is configured to generate feature vector training data by splicing the Mags feature training data and the voiceprint feature training data.

The voice classification module training module is configured to acquire the voice classification model by training the third fixed-length data and the feature vector training data.

In an embodiment, the apparatus for detecting audio may further include: a fully connected network model training module. The fully connected network model training module is configured to acquire attribute detection data to be trained; and acquire the fully connected network model by training the attribute detection data to be trained. The attribute detection data may include at least one of: user rating data, classification probability data, voiceprint feature data, and the like, which is not limited in the embodiments of the present disclosure.

It should be noted that the apparatus for detecting audio as provided above can perform the method for detecting audio according to any embodiment of the present disclosure.

In an embodiment, the apparatus for detecting audio may be integrated in a device. The device may be composed of at least two physical entities, or may be composed of one physical entity. For example, the device may be a PC, a computer, a mobile phone, a tablet, a personal digital assistant, a server, a messaging device, a game console, and the like.

An embodiment of the present disclosure further provides a device. The device includes a processor and a memory storing at least one instruction therein. The processor, when loading and executing the at least one instruction, is caused to perform the method for detecting audio according to the above-mentioned method embodiment.

Figure 4:
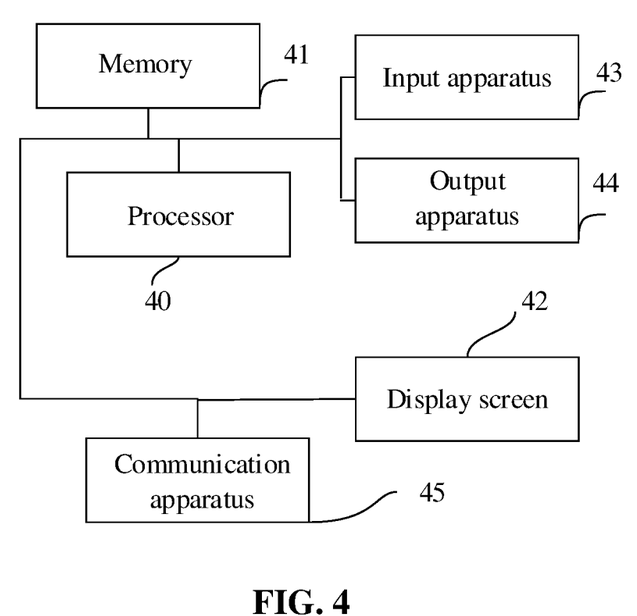
FIG. 4 is a schematic structural block diagram of a device according to an embodiment of the present disclosure.

FIG. 4 shows a schematic structural block diagram of a device according to an embodiment of the present disclosure. As shown in FIG. 4, the device includes: a processor 40, a memory 41, a display screen 42 with a touch function, an input apparatus 43, an output apparatus 44, and a communication apparatus 45. At least one processor 40 may be configured in the device. In FIG. 4, one processor 40 is taken as an example. At least one memory 41 may be configured in the device. In FIG. 4, one memory 41 is taken as an example. The processor 40, the memory 41, the display screen 42, the input apparatus 43, the output apparatus 44, and the communication apparatus 45 of the device may be connected by a bus or other means. In FIG. 4, the connection via the bus is taken as an example.

As a computer-readable storage medium, the memory 41 may be configured to store software programs, computer-executable programs, and modules, such as program instructions/modules (for example, the audio file data acquiring module 310, the attribute detection data determining module 320, the voice violation detecting module 330, and the like in the apparatus for detecting audio) corresponding to the method for detecting audio described in any embodiment of the present disclosure. The memory 41 may mainly include a program storage region and a data storage region. The program storage region may store an operation apparatus program, and an application program required by at least one function. The data storage region may store data created based on the use of the device, and the like. In addition, the memory 41 may include a high-speed random access memory, and may further include a non-volatile memory, such as at least one magnetic disk storage device, a flash memory device, or other non-volatile solid-state storage devices. In some examples, the memory 41 may further include a memory remotely provided with respect to the processor 40. These remote memories may be connected to the device via a network. Examples of the networks include, but are not limited to, the Internet, an intranet, a local area network, a mobile communication network, and combinations thereof.

The display screen 42 is a display screen 42 with a touch function, and may be a capacitive screen, an electromagnetic screen, or an infrared screen. In general, the display screen 42 is configured to display data based on instructions of the processor 40, and is further configured to receive touch operations on the display screen 42 and send corresponding signals to the processor 40 or other devices. In an embodiment, in the case that the display screen 42 is the infrared screen, the display screen 42 further includes an infrared touch frame. The infrared touch frame is disposed around the display 42, and is further configured to receive an infrared signal and send the infrared signal to the processor 40 or other devices.

The communication apparatus 45 is configured to establish a communication connection with other devices, and may be at least one of a wired communication apparatus and a wireless communication apparatus.

The input apparatus 43 is configured to receive input digital or character information, and generate key signal input related to user settings and function control of the device, and is further configured as a camera for acquiring images and a sound pickup device for acquiring audio data. The output apparatus 44 may include an audio device such as a speaker. It should be noted that the composition of the input apparatus 43 and the output apparatus 44 may be set based on actual conditions.

The processor 40 executes various functional applications and data processing of the device by running software programs, instructions, and modules stored in the memory 41, so as to realize the above-mentioned method for detecting audio.

In an embodiment, the processor 40, when loading and executing at least one program stored in the memory 41, is caused to perform the following operations: acquiring audio file data; determining attribute detection data corresponding to the audio file data; and generating a voice detection result corresponding to the audio file data by voice violation detection on the attribute detection data by a fully connected network model.

An embodiment of the present disclosure further provides a computer-readable storage medium storing at least one instruction therein. The at least one instruction, when loaded and executed by a processor of a device, causes the device to perform the method for detecting audio according to the above-mentioned method embodiment. Exemplarily, the method for detecting audio includes: acquiring audio file data; determining attribute detection data corresponding to the audio file data; and generating a voice detection result corresponding to the audio file data by voice violation detection on the attribute detection data by a fully connected network model.

It should be noted that, since the apparatus, device, and storage medium embodiments, are basically similar to the method embodiments, the descriptions are relatively simply given herein. For related parts, reference may be made to the parts of the descriptions of the method embodiments.

Through the above-mentioned description of the embodiments, it can be clearly understood by those skilled in the art that, the present disclosure may be performed by software and necessary general-purpose hardware, and may be performed by hardware. Based on such understanding, the technical solutions of the present disclosure or the part thereof contributing to the related art may be substantially reflected in the form of a software product. The computer software product may be stored in a computer-readable storage medium, and includes several instructions to cause a computer device (which may be a robot, a personal computer, a server, or a network device) to perform the method for detecting audio according to any embodiment of the present disclosure, the storage medium including a floppy disk of a computer, a read-only memory (ROM), a random-access memory (RAM), a flash, a hard disk, an optical disk, and the like.

It is worth noting that, in the above-mentioned apparatus for detecting audio, each unit and module included therein are only classified according to functional logic, but not limited to such classification, as long as the corresponding functions can be realized. In addition, the specific name of each functional unit is only for the convenience of distinguishing each other, and is not used to limit the protection scope of the present disclosure.

It should be noted that each part in the present disclosure may be performed in hardware, software, firmware, or any combination thereof. In the above-mentioned embodiments, a plurality of processes or methods may be performed with software or firmware that are stored in the memory and executed by a suitable instruction execution system. For example, if they are performed with hardware, as in another embodiment, they may be performed by using any one or a combination of the following techniques well known in the art: a discrete logic circuit having a logic gate circuit implementing logic functions of data signals, an application-specific integrated circuit with a suitable combinational logic gate circuit, a programmable gate array (PGA), a field programmable gate array (FPGA), and the like.

In the description of the present specification, the description of referring terms such as "an embodiment," "some embodiments," "an example,", "a specific example," and "some examples" means that particular features, structures, materials or characteristics combined with the embodiments or example descriptions are included in at least one embodiment or example of the present disclosure. In the specification, schematic description of the above-mentioned terms is not necessarily directed to the same embodiment or example. Furthermore, the described particular features, structures, materials, or characteristics can be integrated with any one or more embodiments or examples in a proper manner.

What is claimed is:

1. A method for detecting audio, comprising:
acquiring audio file data;
determining attribute detection data corresponding to the audio file data, wherein the attribute detection data comprises at least two of: user rating data, classification probability data, and voiceprint feature data, the user rating data being indicative of a user rating, the classification probability data being indicative of a classification probability corresponding to a voice violation, and the voiceprint feature data being indicative of a voiceprint feature corresponding to the audio file data; and
generating a voice detection result corresponding to the audio file data by voice violation detection on the attribute detection data by a fully connected network model,
wherein the attribute detection data comprises the classification probability data and at least one of the user rating data and the voiceprint feature data; and
wherein determining the attribute detection data corresponding to the audio file data comprises:
acquiring at least two frames of audio time-domain information by slicing the audio file data;
acquiring magnitude spectrum feature data and voiceprint feature data by feature extraction on the at least two frames of audio time-domain information;
generating feature vector data by splicing the magnitude spectrum feature data and the voiceprint feature data; and
acquiring the classification probability data by voice classification on the feature vector data by a voice classification model.

2. The method according to claim 1, wherein acquiring the magnitude spectrum feature data and the voiceprint feature data by the feature extraction on the at least two frames of audio time-domain information comprises:
acquiring audio frequency-domain information by frequency-domain transformation on the at least two frames of audio time-domain information;
acquiring the magnitude spectrum feature data by magnitude spectrum feature extraction based on the audio frequency-domain information; and
acquiring the voiceprint feature data by voiceprint feature extraction based on the audio frequency-domain information.

3. The method according to claim 1, wherein the attribute detection data comprises the voiceprint feature data;
determining the attribute detection data corresponding to the audio file data comprises:
acquiring audio frequency-domain information by frequency-domain transformation on the at least two frames of audio time-domain information;
acquiring first fixed-length data by averaging the audio frequency-domain information; and
acquiring the voiceprint feature data by voiceprint feature extraction by a neural network model based on the first fixed-length data.

4. The method according to claim 3, further comprising:
acquiring audio file data to be trained from a training set;
acquiring frame time-domain information by slicing the audio file data to be trained by using a moving window;
acquiring frame frequency-domain information by frequency-domain transformation on the frame time-domain information;
acquiring second fixed-length data by averaging the frame frequency-domain information; and
acquiring the neural network model by training according to a neural network algorithm based on the second fixed-length data and label data corresponding to the audio file data.

5. The method according to claim 1, wherein the attribute detection data comprises the user rating data, the method further comprises:
acquiring history behavior data of a target user, wherein the history behavior data comprises at least one of: history login data, user consumption behavior data, violation history data, and recharge history data; and
acquiring the user rating data based on the history behavior data, and storing the user rating data in a database;
determining the attribute detection data corresponding to the audio file data comprises:

acquiring the user rating data corresponding to the target user from the database based on user information corresponding to the audio file data.

6. The method according to claim 1, further comprising:
determining that the audio file data comprises violation voice data in response to the voice detection result being a voice violation detection result; and
prohibiting a transmission or playback of the violation voice data, or shielding a voice input from a user corresponding to the violation voice data.

7. The method according to claim 1, further comprising:
acquiring frame time-domain information by slicing acquired audio file data to be trained by using a moving window;
acquiring magnitude spectrum feature training data and voiceprint feature training data by feature extraction on the frame time-domain information, wherein the feature extraction of the frame time-domain information comprises: magnitude spectrum feature extraction and voiceprint feature extraction;
acquiring third fixed-length data by averaging the magnitude spectrum feature training data;
generating feature vector training data by splicing the magnitude spectrum feature training data and the voiceprint feature training data; and
acquiring the voice classification model by training the third fixed-length data and the feature vector training data.

8. The method according to claim 1, further comprising:
acquiring attribute detection data to be trained; and
acquiring the fully connected network model by training the attribute detection data to be trained.

9. A device, comprising:
a processor; and
a memory storing at least one instruction therein;
wherein the processor, when loading and executing the at least one instruction, is caused to:
acquire audio file data;
determine attribute detection data corresponding to the audio file data, wherein the attribute detection data comprises at least two of: user rating data, classification probability data, and voiceprint feature data, the user rating data being indicative of a user rating, the classification probability data being indicative of a classification probability corresponding to a voice violation, and the voiceprint feature data being indicative of a voiceprint feature corresponding to the audio file data; and
generate a voice detection result corresponding to the audio file data by voice violation detection on the attribute detection data by a fully connected network model,
wherein the attribute detection data comprises the voiceprint feature data and at least one of the user rating data and the classification probability data; and
wherein in order to determine the attribute detection data corresponding to the audio file data, the processor is caused to:
acquire at least two frames of audio time-domain information by slicing the audio file data,
acquire audio frequency-domain information by frequency-domain transformation on the at least two frames of audio time-domain information;
acquire first fixed-length data by averaging the audio frequency-domain information; and acquire the voiceprint feature data by voiceprint feature extraction by a neural network model based on the first fixed-length data.

10. The device according to claim 9, wherein the attribute detection data comprises the classification probability data;
in order to determine the attribute detection data corresponding to the audio file data, the processor is caused to:
acquire magnitude spectrum feature data and voiceprint feature data by feature extraction on the at least two frames of audio time-domain information;
generate feature vector data by splicing the magnitude spectrum feature data and the voiceprint feature data; and
acquire the classification probability data by voice classification on the feature vector data by a voice classification model.

11. The device according to claim 10, wherein in order to acquire the magnitude spectrum feature data and the voiceprint feature data by the feature extraction on the at least two frames of audio time-domain information, the processor is caused to:
acquire audio frequency-domain information by frequency-domain transformation on the at least two frames of audio time-domain information;
acquire the magnitude spectrum feature data by magnitude spectrum feature extraction based on the audio frequency-domain information; and
acquire the voiceprint feature data by voiceprint feature extraction based on the audio frequency-domain information.

12. The device according to claim 9, wherein the at least one instruction further causes the processor to:
acquire audio file data to be trained from a training set;
acquire frame time-domain information by slicing the audio file data to be trained by using a moving window;
acquire frame frequency-domain information by frequency-domain transformation on the frame time-domain information;
acquire second fixed-length data by averaging the frame frequency-domain information; and
acquire the neural network model by training according to a neural network algorithm based on the second fixed-length data and label data corresponding to the audio file data.

13. The device according to claim 9, wherein the attribute detection data comprises the user rating data, the at least one instruction further causes the processor to:
acquire history behavior data of a target user, wherein the history behavior data comprises at least one of: history login data, user consumption behavior data, violation history data, and recharge history data; and
acquire the user rating data based on the history behavior data, and storing the user rating data in a database;
in order to determine the attribute detection data corresponding to the audio file data, the processor is caused to:
acquire the user rating data corresponding to the target user from the database based on user information corresponding to the audio file data.

14. The device according to claim 9, wherein the at least one instruction further causes the processor to:
determine that the audio file data comprises violation voice data in response to the voice detection result being a voice violation detection result; and prohibit a transmission or playback of the violation voice data, or shielding a voice input from a user corresponding to the violation voice data.

15. The device according to claim 9, wherein the at least one instruction further causes the processor to:
   acquire frame time-domain information by slicing acquired audio file data to be trained by using a moving window;
   acquire magnitude spectrum feature training data and voiceprint feature training data by feature extraction on the frame time-domain information, wherein the feature extraction of the frame time-domain information comprises: magnitude spectrum feature extraction and voiceprint feature extraction;
   acquire third fixed-length data by averaging the magnitude spectrum feature training data;
   generate feature vector training data by splicing the magnitude spectrum feature training data and the voiceprint feature training data; and
   acquire the voice classification model by training the third fixed-length data and the feature vector training data.

16. The device according to claim 9, wherein the at least one instruction further causes the processor to:
   acquire attribute detection data to be trained; and
   acquire the fully connected network model by training the attribute detection data to be trained.

17. A non-transitory computer-readable storage medium storing at least one instruction therein, wherein the at least one instruction, when loaded and executed by a processor of a device, causes the device to:
   acquire audio file data;
   determine attribute detection data corresponding to the audio file data, wherein the attribute detection data comprises at least two of: user rating data, classification probability data, and voiceprint feature data, the user rating data being indicative of a user rating, the classification probability data being indicative of a classification probability corresponding to a voice violation, and the voiceprint feature data being indicative of a voiceprint feature corresponding to the audio file data; and
   generate a voice detection result corresponding to the audio file data by voice violation detection on the attribute detection data by a fully connected network model,
   wherein the attribute detection data comprises the classification probability data and at least one of the user rating data and the voiceprint feature data; and
   wherein in order to determine the attribute detection data corresponding to the audio file data, the processor is caused to:
   acquire at least two frames of audio time-domain information by slicing the audio file data;
   acquiring magnitude spectrum feature data and voiceprint feature data by feature extraction on the at least two frames of audio time-domain information;
   generating feature vector data by splicing the magnitude spectrum feature data and the voiceprint feature data; and
   acquiring the classification probability data by voice classification on the feature vector data by a voice classification model.

* * * * *